United States Patent [19]

Welsh

[11] Patent Number: 4,690,522
[45] Date of Patent: Sep. 1, 1987

[54] MICROSCOPE ILLUMINATOR SUPPORT

[76] Inventor: Robert C. Welsh, Ste. 608, 168 SE. 1st St., Miami, Fla. 33131

[21] Appl. No.: 750,279

[22] Filed: Jul. 1, 1985

[51] Int. Cl.$^4$ ............................................. G02B 21/08
[52] U.S. Cl. .................................................... 350/528
[58] Field of Search ............................... 350/243–244, 350/248, 235–238, 507–508, 523–528, 585; 351/211, 221, 214

[56] References Cited

U.S. PATENT DOCUMENTS

| | | | |
|---|---|---|---|
| 737,087 | 8/1903 | De Zeng | 351/221 |
| 1,538,191 | 5/1925 | Lando | 351/221 |
| 2,096,325 | 10/1937 | Heine | 350/236 |
| 2,104,198 | 1/1938 | Jones | 350/235 |
| 2,285,987 | 6/1942 | Krimsky | 350/235 |
| 3,011,258 | 12/1961 | Kotchan | 350/244 |
| 3,186,296 | 6/1965 | Erban | 350/238 |
| 4,470,670 | 9/1984 | Ingle et al. | 350/523 |

FOREIGN PATENT DOCUMENTS 1113314  8/1961  Fed. Rep. of Germany ...... 350/528

OTHER PUBLICATIONS

Yakubenas et al "Contact Microscope for Laboratory Studies" Soviet Jr. of Optical Technology, 3-1976, pp. 160–163.
Titan, "Titan Measuring Microscopes", Advertisement from Titan Tool Supply Co. Sheet #20H, Buffalo, N.Y. 1-1-72.
Parco, "Parco EM Series", Advertisement from Parco Scientific Co., Vienna, Ohio.
Instruments, "Surface Plate Inspection Microscope & Illuminators" Instruments, vol. 23 1-1950, p. 44.

Primary Examiner—William H. Punter
Attorney, Agent, or Firm—Parkhurst & Oliff

[57] ABSTRACT

The invention relates to illuminator support for supporting an illuminator such that a beam of light projected from the illuminator is generally coaxial with a line of vision to the subject to be viewed. In a preferred embodiment, the illuminator includes a plate having an aperture therethrough for reception of a lens for a microscope. The line of vision is defined by the axis of the lens. The plate supports a bracket which holds an illuminator on a side of the microscope, the illuminator projecting a beam of light on the subject beneath the lens. In the preferred embodiment, the bracket supports the illuminator so that the beam of light is projected along an axis at an angle of 5°–8° with respect to the axis of the line of vision.

10 Claims, 4 Drawing Figures

MICROSCOPE ILLUMINATOR SUPPORT

BACKGROUND AND SUMMARY OF THE INVENTION

The present invention relates to an illuminator for a microscope. More particularly, the present invention relates to a support for an illuminator which permits the projection of a beam of light from the illuminator along an axis generally coaxial with a line of vision through a microscope.

When using a microscope for magnification of a subject, it is often necessary to illuminate the subject to be viewed with a beam of light. The need for illumination is particularly true for physicians that require a microscope for magnifying a subject during surgery or medical examinations. For example, certain types of eye surgery require a microscope and an illuminator. In eye surgery for removal of cateracts or implantation of a lens, an illuminator for the microscope is necessary in order to properly illuminate the eye.

In such medical situations, the microscope is usually mounted on a stand having a cantilevered arm for supporting the microscope over the subject to be viewed. Thus, the illuminator for such a cantilever-supported microscope must provide sufficient light without interfering with the line of vision through the microscope. Further, the illuminator should be positioned to provide sufficient illumination without interfering with the physician's arms and hands, i.e., without interfering with the physician's manual dexterity.

A conventional support for a microscope and illuminator is illustrated in FIGS. 1A and 1B. The support includes a base 10 having a size sufficient to ensure its stability in all directions. A post 12 extends from the base and adjustably supports a boom arm 14 through a bracket 16. The bracket 16 preferably permits vertical adjustment of the height of the boom arm 14 on the post 12. In addition, the bracket 16 permits lateral adjustment of the boom arm 14 relative to the bracket 16, i.e., extension of the boom arm 14 by varying the longitudinal position of the bracket on the boom arm. If necessary, the bracket 16 may permit angular adjustment of the boom arm 14 relative to the post 12.

The boom arm 14 has a microscope holder 20 on one end and a counterweight 18 on an opposite end. The microscope holder 20 is removably secured to the end of the boom arm 14 by clamps 22 which permit variations of the position of the microscope holder on the boom arm. For example, the clamp 22 may permit adjustment of the angular position of the microscope relative to the boom arm.

The microscope holder 20 has an opening 24 therethrough surrounded by a microscope supporting face 26. The size of the opening 24 is sufficient to receive a microscope 28 (FIG. 1B) having an eyepiece 30 and a lens 32. The lens 32 is inserted through the opening 24 so that a face 34 of the microscope rests on the supporting face 26 of the microscope holder 20. The microscope 28 may be fixed to the microscope holder 20 by any suitable fastening device. Thus, the physician may place the subject (e.g., the eye of the patient) beneath the lens 32 of the microscope and view the subject through the eyepiece 30. A line of vision A is defined through the lens 32. The microscope holder may be provided with adjustment knobs 38 for focusing the microscope on the subject.

In order to illuminate the subject, the microscope holder 20 includes a light holder 40 for supporting an illuminator 42. Preferably, the illuminator 42 is a 20 watt Quartz Hallogen light tube having a light source in a large block 44 and a tube 46 extending from the block 44. A beam of light B is projected through the tube 46 toward the subject beneath the lens 32. Such light tubes are well known and will not be described in detail.

To support the illuminator 42, the tube 46 is inserted into an angled bore 48 (illustrated in phantom in FIGS. 1A and 1B) of the light holder 40 on the microscope holder 20, the bore being located to one side of the opening 24 for the microscope. The bore 48 has a diameter and length sufficient to receive and support the tube 46 at a position adjacent to the lens 32 of the microscope. The angle of the bore 48 supports the tube 46 so that the beam of light B is projected onto the subject at an angle a of approximately 15° from the line of vision A.

The above-described microscope and illuminator support are satisfactory in most circumstances. However, since the illuminator projects light along a line B angled at approximately 15° with respect to the line of vision A, the illuminator may not provide sufficient illumination of the subject to be viewed. This is particularly true for illuminating an eye during eye surgery for cataracts. If the cataract is not sufficiently illuminated, then portions of the cataract may not be seen by the physician and thus not removed. Another concern particularly noted by physicians is that the position of the illuminator may interfere with the physician's hands and/or cast shadows on the subject.

The present invention was created to obviate the above-noted disadvantageous features of known microscope holders. It is an object of the present invention to remedy these drawbacks by providing a support for an illuminator which permits light to be directed along a line generally coaxial with the line of vision for improving the illumination of the subject.

A further object of the present invention is to provide a support for an illuminator which projects a beam of light at an angle (e.g., 5°–8°) less than the angle associated with known illuminator supports (e.g. 15°).

It is another object of the present invention to provide a support for an illuminator which does not cast shadows over the subject or interfere with a physician's manual dexterity.

These and other objects and advantages are obtained by the present invention which relates to a generally coaxial illuminator. In a preferred embodiment, the coaxial illuminator includes a plate having an aperture therethrough for reception of a lens of a microscope. A line of vision is defined by the axis of the lens. The plate includes bracket means for supporting an illuminator on one side of the microscope. The illuminator projects a beam of light on a subject beneath the lens. The bracket means supports the illuminator so that the beam of light is projected along a line generally coaxial with the line of vision. Preferably, the illuminator support in accordance with the invention permits the projection of a beam of light at an angle in the range of approximately 5°–8° from the line of vision.

BRIEF DESCRIPTION OF THE DRAWINGS

The present invention will be described herein in detail taken in conjunction with the appended drawings in which like elements bear like reference numerals and in which.

DETAILED DESCRIPTION OF THE PREFERRED EMBODIMENT

Theoretically, the most advantageous support for an illuminator permits the illuminator to project a beam of light along an axis coaxial with the line of vision. However, such coaxial illumination is difficult to achieve since the illuminator interferes or blocks the line of vision to the subject. The present invention relates to an illuminator support which projects a beam of light at an angle of 5°-8° to the line of vision. Due to the proximity of the light beam to the line of vision, illuminator supports in accordance with the present invention are sometimes referred to as "coaxial illuminators" with the 5°-8° angle being considered negligible in view of prior art illuminator supports having much greater angles of approximately 15° or more. Nevertheless, an absolute or true coaxial relationship is not obtained in view of the 5°-8° angle between the line of vision and light beam. The term "generally coaxial" as used herein and in the claims is defined as being within 5°-8° of truely coaxial.

Figure 1A:
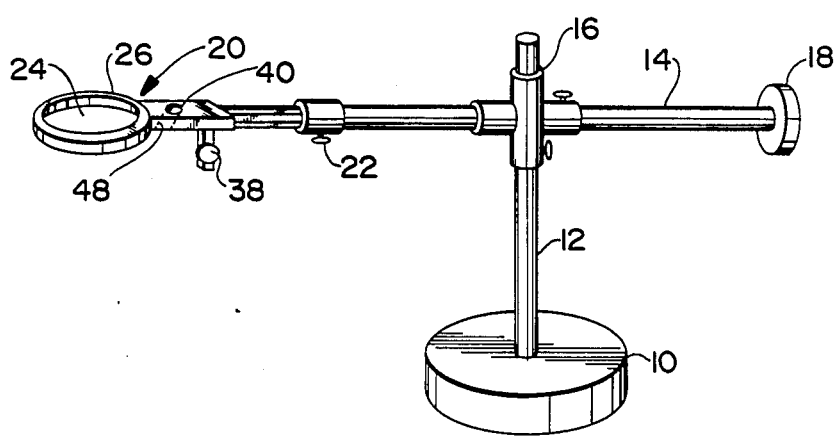
FIG. 1A is a perspective view of a conventional microscope support stand.
Figure 1B:
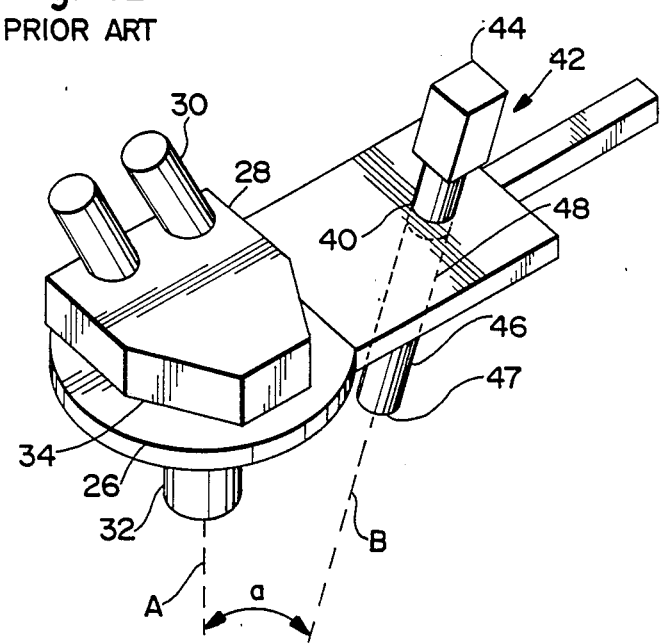
FIG. 1B is an enlarged perspective view of the conventional microscope support stand of FIG. 1 supporting a microscope and an illuminator.
Figure 2:
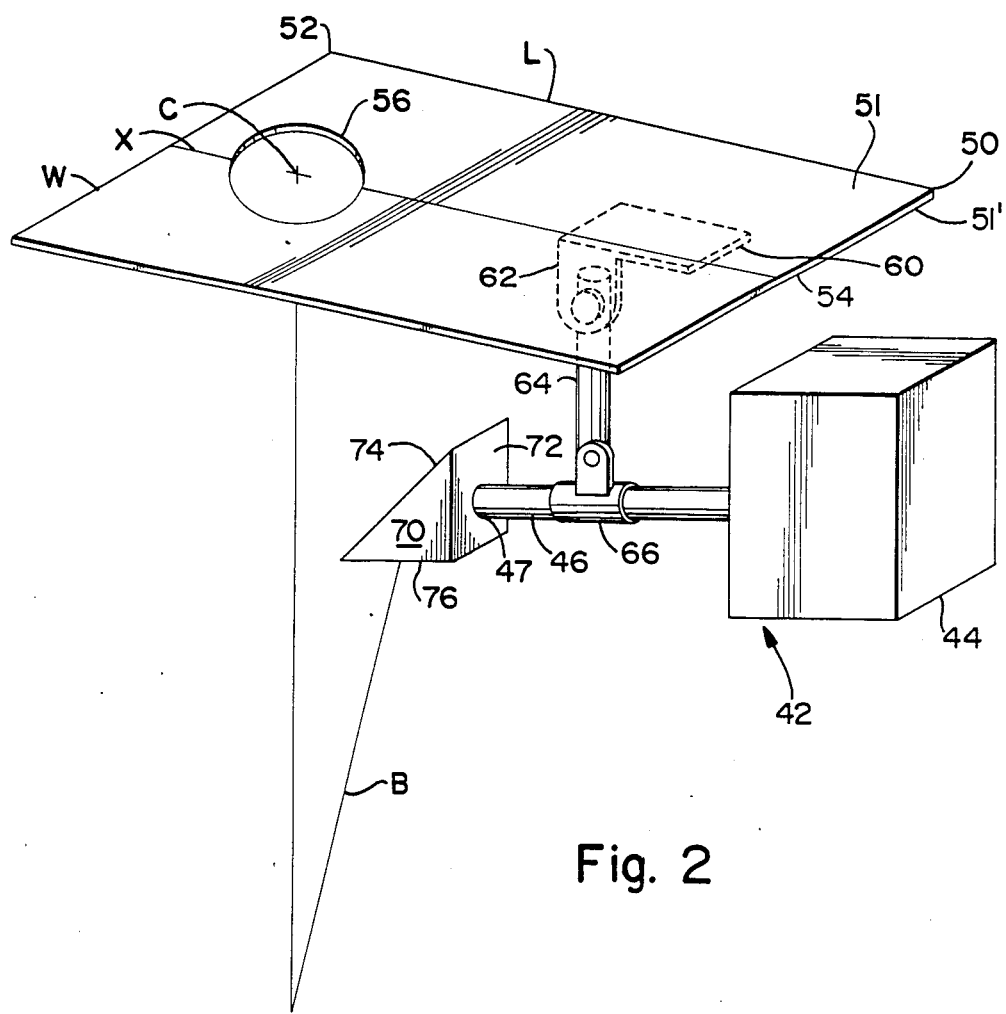
FIG. 2 is a perspective view of the improved illuminator support in accordance with the present invention.
Figure 3:
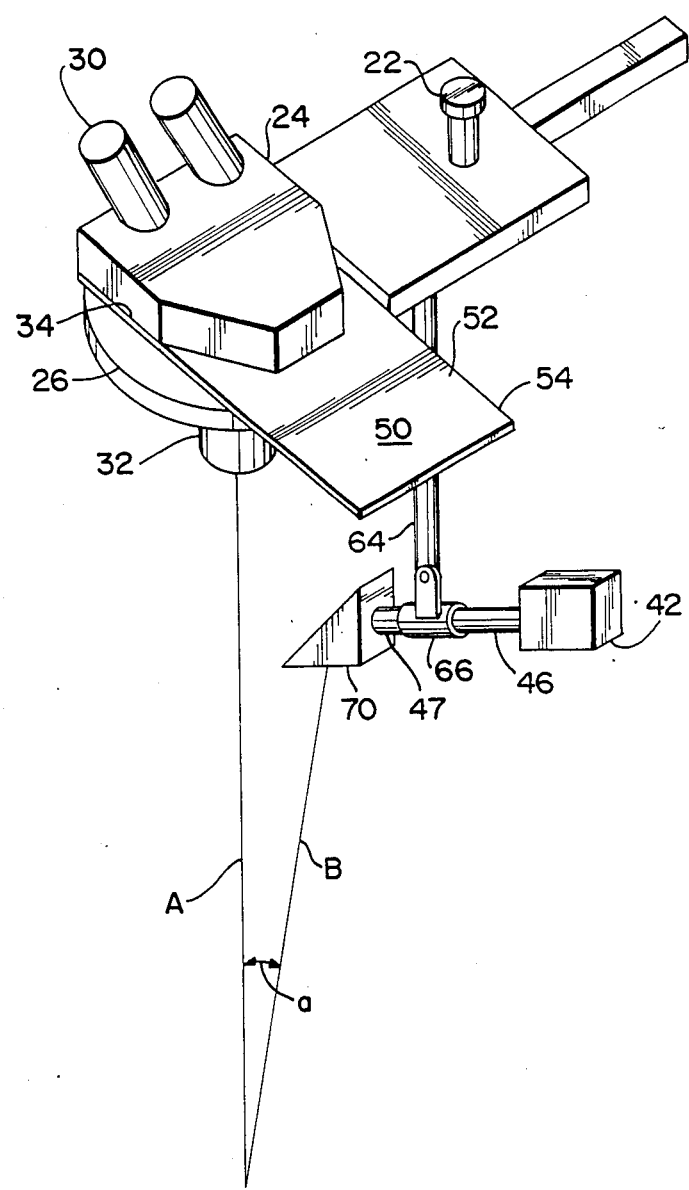
FIG. 3 is a perspective view of the improved illuminator support of FIG. 2 mounted on the microscope holder of FIG. 1.

With reference to FIGS. 2 and 3, the illuminator of the present invention generally includes a plate 50 for attachment to a microscope holder and a bracket 60 (illustrated in phantom in FIGS. 2 and 3) depending from the underside of the plate for supporting an illuminator. The plate 50 is preferably rectangular and made of a material having sufficient rigidity to support the illuminator. For example, the plate may be made of stainless steel or steel with a chrome plating. Preferably, a short edge W of the plate is approximately 100 mm wide, while a long edge L is approximately 175 mm long.

The plate 50 has a thickness which permits it to be clamped between the microscope supporting face 26 and the face 34 of the microscope. Preferably, the plate is approximately 1.3-1.5 mm thick between a top surface 51 of the plate 50 and a bottom surface 51'. A first portion 52 of the plate 50 is thus clamped onto the boom arm 14 of the microscope support between the faces 26 and 34, while a second portion 54 of the plate 50 extends outward away from the microscope 28, preferably on the side of the microscope opposite from the eyepiece 30 so as not to interfere with viewing the subject through the eyepiece 30.

The first portion 52 of the plate 50 includes a viewing aperture 56 for accommodating the lens 32 of the microscope 28. That is, the lens 32 is inserted through both the viewing aperture 56 and the opening 24 in the microscope holder when the plate 50 is clamped between the supporting face 26 and microscope face 34. The size of the viewing aperture 56 roughly corresponds to the size of the opening 24 in the microscope holder. For example, the viewing aperture 56 may be circular with a diameter of about 76.6 mm for a Nikon SMZ-1 microscope or about 83.3 mm for a Swift microscope. The aperture 56 is positioned in the plate 50 to align with the opening 24 in the microscope holder but still provide a sufficient edge portion of the plate surrounding the viewing aperture 56 for clamping the plate onto the microscope holder. Preferably, the center of the viewing aperture 56 is located along a central longitudinal axis of the plate. In a preferred embodiment for use with a Nikon SMZ-1 microscope, the center is located preferably 50 mm from the long edge L of the plate and 54.75 mm from the short edge W of the plate. Other dimensions are within the scope of the invention, the dimension depending on associated equipment, such as the type of microscope.

The second portion 54 of the plate 50 extends away from the viewing aperture 56 preferably to the side of the microscope opposite from the eyepiece 30. The second portion may extend to other sides of the microscope, e.g. the side of the microscope opposite from clamps 22.

A bracket 60 is fixed to the underside or bottom surface 51' of the plate 50 preferably by welding or other suitable fastening devices such as bolts and nuts. One edge of the bracket 60 is provided with a depending flange 62 which preferably perpendicularly extends away from the bottom surface 51' of the plate 50. The flange is preferably located along the longitudinal axis X of the plate that extends from the center C of the viewing aperture 56 parallel to the long edge L of the plate. The end of the flange opposite from the plate is provided with an opening or other suitable mechanism for providing a pivotable connection at the end of the flange.

One end of an arm 64 is pivotably attached at the end of the flange 62. The opposite end of the arm 64 includes a clamp 66 through which the tube 46 of the illuminator 42 is inserted. The clamp 66 may be pivotably attached to the opposite end of the arm 64.

The illuminator 42 is preferably a 20 watt Quartz-Halogen light tube. The outlet end 47 of the tube 46 for the illuminator 42 is provided with a prism 70 for deflecting the light from the tube 46 at an angle of approximately 90°. More specifically, the prism 70 has a triangular shape with a light inlet face 72, a light reflecting face 74, and a light outlet face 76. The reflecting face 74 has an internal reflective surface. Light entering the prism through the inlet face 72 is deflected by 90° on the reflecting surface and projected through the outlet face 76 as the beam of light B.

The illuminator support is assembled by inserting the tube 46 of the illuminator 42 into the clamp 66 and attaching the prism 70 to the tip of the tube. The assembly of the plate, bracket, clamp, illuminator and prism is then mounted on the microscope stand by aligning the viewing aperture 56 of the plate 50 with the opening 24 in the microscope holder. The lens 32 of the microscope is then inserted through the aligned aperture 56 and opening 24, both the microscope and plate thus being fixed to the microscope stand.

With respect to FIG. 3, the coaxial illuminator is mounted on the microscope stand by clamping the first portion 52 of the plate 50 between the microscope face 34 and microscope supporting face 26. In this position, the second portion 54 of the plate 50 having the bracket 60 and illuminator 42 is located on a side of the microscope opposite from the eyepiece 30. The pivotal connections of the flange 62 of the bracket 60 and arm 64 permit the illuminator to be located in a generally horizontal plane relative to the subject to be viewed. Further, the pivotal connections of the arm 64 on the bracket 60 permit the prism on the tip of the tube 46 for the illuminator 42 to be moved generally horizontally toward the lens 32 to a point at which the beam of light B projected through the prism 70 is closely adjacent the line of vision A through the lens 32. In this position, the beam of light B from the illuminator is directed along an axis generally coaxial with the line of vision A. In fact, the light beam B is at an angle a of approximately 5°–8° with respect to the line of vision. This 5°–8° angle, however, is much smaller than the angle associated with known illuminator supports (e.g., 15° or more), and thus the illuminator support in accordance with the present invention provides more complete illumination than prior art illuminator supports.

The present invention thus provides an illuminator support which reduces shadows cast on the subject to be viewed by generally coaxially aligning the light beam B with the line of vision A. Further, the illuminator support of the present invention also supports the illuminator on a microscope stand without interferring with the physician or microscope.

The relative positioning of the aperture, bracket and arm facilitates the generally coaxial illumination. For example, with a Nikon SMZ-1 microscope, the aperture has a diameter of preferably 76.6 mm. The flange of the bracket is arranged approximately 62 mm from the center of the aperature along the longitudinal axis of the plate. The length of the flange is approximately 30 mm. With these dimensions, a 20 Watt Quartz Halogen light tube can be positioned to project a beam of light B along a line generally coaxial with a line of vision A.

A preferred embodiment of the present invention has been described herein. However, variations of the invention are possible. For example, the dimensions and relative positions of the plate, viewing aperture, and bracket may be varied without departing from the scope of the invention. Further, the invention is not limited to the specifically mentioned microscope and-/or illuminators, but is adaptable to other devices.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by others without departing from the spirit of the invention. Accordingly, it is expressly intended that all such variations and changes which fall within the spirit and scope of the present invention as defined in the claims be embraced thereby.

What is claimed is:

1. An illuminator support for use with a microscope holder having an opening therethrough of a dimension sufficient to receive a lens for a microscope, a line of vision being defined by said lens and a subject to be viewed with said microscope, said illuminator support comprising:
    a plate having a first portion and a second portion, said first portion being clamped between said microscope and said microscope holder and having an aperture therethrough of dimensions corresponding to the dimensions of said opening, said lens being inserted through said aperture;
    said second portion extending from said first portion; and
    bracket means secured to said second portion of said plate for supporting an illuminator means for projecting a beam of light, said bracket means including an arm, said arm having one end pivotably attached to said plate and an opposite end with a clamp for supporting said illuminator means, said illuminator means having an outlet end for projecting a beam of light therethrough, said bracket means locating said outlet end of said illuminator means such that an angle between said beam of light and said line of vision is in the range of 5°–8°.

2. The illuminator support of claim 1, wherein said line of vision is perpendicular to a plane of said plate.

3. The illuminator support of claim 1, wherein said plate has a rectangular shape.

4. The illuminator support of claim 1, wherein said aperture has a circular shape.

5. The illuminator support of claim 1, wherein said aperture has a center located along a longitudinal axis of said plate, and said bracket means is aligned with said center of said aperture along said longitudinal axis.

6. The illuminator support of claim 1, wherein said clamp is pivotably attached to said opposite end of said arm.

7. The illuminator support of claim 1, wherein said illuminator means includes a prism at its outlet end, said prism deflecting said beam of light by approximately 90° from a major axis of said illuminator.

8. The illuminator support of claim 7, wherein said prism has a triangular cross-sectional shape, said prism including an inlet face and an outlet face arranged in a plane perpendicular to a plane of said inlet face, said prism further including a reflecting face arranged in a plane intersecting the planes of said inlet and outlet faces, said reflecting face having a reflecting surface for deflecting said beam of light, the beam of light entering said inlet face and exiting through said outlet face.

9. In a microscope stand having a microscope holder and a light holder for an illuminator, the microscope holder including an opening for receiving a lens of a microscope, a line of vision being defined by said lens and a subject to be viewed by said microscope, the improvement comprising:
    a plate having first and second portions, said first portion having an aperture corresponding in size and shape with said opening, said aperture receiving said lens such that said first portion of said plate is clamped between said microscope and said microscope holder, said second portion extending from said first portion;
    bracket means fixed to said second portion of said plate for supporting said illuminator on said plate, said bracket means including an arm having one end pivotably connected to said plate and an opposite end having a clamp for securing said illuminator to said arm; and
    said illuminator having an outlet end for projecting a beam of light therethrough and prism means located at said outlet end for deflecting said beam of light by 90° from a major axis of said illuminator, said prism means projecting said beam of light toward said subject at an angle of 5°–8° from said line of vision.

10. In the microscope stand of claim 9, wherein the line of vision is perpendicular to a plane of said plate.

* * * * *